UNITED STATES PATENT OFFICE.

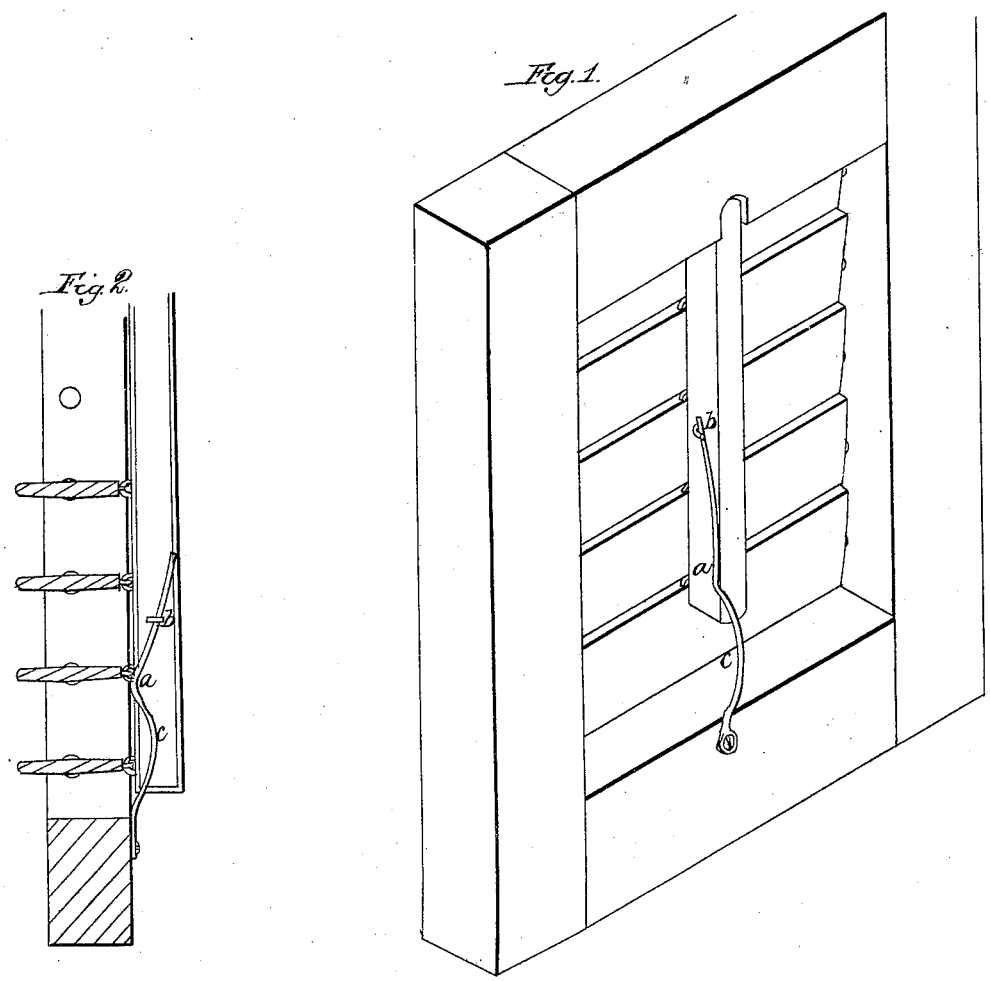

WILLIAM L. GALLAUDET, OF NEW YORK, N. Y.

SPRING-HOLDER FOR SLAT-BLINDS.

Specification of Letters Patent No. 16,053, dated November 11, 1856.

*To all whom it may concern:*

Be it known that I, WILLIAM L. GALLAUDET, of New York, county of New York, and State of New York, have invented a certain new and useful Improvement in Spring-Holders for Movable Slat-Blinds; and I do hereby declare that the following is a full, clear, and exact description of the same, reference being made to the annexed drawing, making a part of this specification, in which—

Figure I is a perspective view of a blind with my improvement attached. Fig. II is a transverse vertical section, and similar letters indicate similar parts throughout.

My invention consists in applying a spring to the lower end of the rod connecting the slats, which spring is so peculiarly shaped that when the slats are placed in any desired position the spring will hold them there, but with a tendency, in case of any jarring or slamming, to close the slats.

I am aware that springs have been affixed to the rod to produce frictional pressure and thereby hold the slats in position, but the weight of the rod on blinds that turn easily has always a tendency to open them by its dropping down, and mere frictional pressure does not hold the rod in place for any length of time, since every vibration, either from the wind or from heavy vehicles in the street, causes the rod to settle a little, until it is soon at its lowest point and the slats become turned so as to admit the rain or sun.

My construction is as follows: To the lower rail of a blind I affix a spring of suitable metal, formed in the manner shown at (*a*), that is, having its upper end inclined so that when in the position shown in Fig. I it shall point toward the slats, and when in that of Fig. II shall point away from the said slats. The upper end plays in a hook or staple (*b*) affixed to the rod, and the springing or elasticity is confined to the curve (*c*) at the lower part.

The operation will be, that when the slats are set wide open, as in Fig. II, the rod would be held, by the simple frictional pressure of the spring, from dropping farther, if there were no vibrations, but against those it is still kept from falling by the fact that the hook (*b*) would then have the action as if ascending an inclined plane, and must further deflect the spring in doing so. Indeed the effect of those vibrations will rather be to cause the hook to rise along the spring and thus ultimately to close the slats, which is an advantage when a storm is coming up, as the effect of the wind will thus close them against the rain. As the rod is raised the pressure of the spring is of course weakened, but from the position of the slats the power is greater, and thus when closed the spring serves to keep them so. The rod cannot turn on to its side, for although the spring pressing toward the slats would throw the rod over if against a pin, the upper part of it is prevented from leaving the rod laterally by the hook (*b*) and thus the lower end of the rod must bear at its side against the spring.

I claim—

The combination of the peculiarly shaped spring herein described with the rod and with the lower rail, substantially in the manner set forth.

WM. L. GALLAUDET.

Witnesses:
S. H. MAGUARD,
THOMAS DUCEY.